(12) United States Patent
Catorcini et al.

(10) Patent No.: US 7,533,268 B1
(45) Date of Patent: May 12, 2009

(54) DIGITAL SIGNATURE WITH AN EMBEDDED VIEW

(75) Inventors: Alessandro Catorcini, Redmond, WA (US); Arungundram Narendran, Sammamish, WA (US); Danny van Velzen, Redmond, WA (US); Mihaela C. Cris, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 627 days.

(21) Appl. No.: 10/876,418

(22) Filed: Jun. 25, 2004

Related U.S. Application Data

(62) Division of application No. 10/846,428, filed on May 13, 2004.

(51) Int. Cl.
*H04L 9/00* (2006.01)
(52) U.S. Cl. .................. 713/176; 713/168; 713/170
(58) Field of Classification Search ................ 713/170, 713/168, 176
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,222,160 A | 6/1993 | Sakai et al. | |

(Continued)

FOREIGN PATENT DOCUMENTS

EP 0841615 11/1999

(Continued)

OTHER PUBLICATIONS

U.S. Appl. No. 60/209,713, filed Jan. 1, 1900, Kutay et al.

(Continued)

*Primary Examiner*—Nasser G Moazzami
*Assistant Examiner*—Oscar A Louie

(57) ABSTRACT

Digital signatures having an embedded view of signed data that lock the signed data but permit it to be repurposed are described. One of these digital signatures can be repurposed for signature by others, such as co-signers or counter-signers. Another of these digital signatures includes embedded information sufficient to recreate the embedded view using the signed data. A method for building a digital signature is also described that permits signing different parts of an electronic document.

20 Claims, 9 Drawing Sheets

U.S. PATENT DOCUMENTS

| | | |
|---|---|---|
| 5,228,100 A | 7/1993 | Takeda et al. |
| 5,237,680 A | 8/1993 | Adams et al. |
| 5,249,275 A | 9/1993 | Srivastava |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Hefferman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A | 1/1999 | Morris et al. |
| 5,864,819 A | 1/1999 | De Armas et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,974,454 A | 10/1999 | Apfel et al. |
| 5,982,370 A | 11/1999 | Kamper |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman |
| 6,078,924 A | 6/2000 | Ainsbury et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |

| | | |
|---|---|---|
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A | 12/2000 | Strong |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucciistopher |
| 6,225,998 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,271 B1 | 10/2001 | Gennaro et al. |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,342,907 B1 | 1/2002 | Petty et al. |
| 6,343,149 B1 | 1/2002 | Motoiwa |
| 6,343,302 B1 | 1/2002 | Graham |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,405,221 B1 | 6/2002 | Levine et al. |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,598,219 B1 | 7/2003 | Lau |
| 6,603,489 B1 | 8/2003 | Edlund et al. |
| 6,604,099 B1 | 8/2003 | Chung et al. |
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 | 12/2003 | Aiken et al. |
| 6,668,369 B1 | 12/2003 | Krebs et al. |
| 6,671,805 B1 * | 12/2003 | Brown et al. ............... 713/176 |
| 6,675,202 B1 | 1/2004 | Perttunen |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |

| Patent | Date | Name |
|---|---|---|
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,826 B1 * | 6/2004 | Paltenghe .................. 713/170 |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,872,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,133 B2 | 9/2005 | Haley |
| 6,948,135 B1 | 9/2005 | Ruthfield et al. |
| 6,950,980 B1 | 9/2005 | Malcolm |
| 6,961,897 B1 | 11/2005 | Peel, Jr. et al. |
| 6,963,875 B2 | 11/2005 | Moore et al. |
| 6,968,503 B1 | 11/2005 | Chang et al. |
| 6,968,505 B2 | 11/2005 | Stoll et al. |
| 6,993,714 B2 | 1/2006 | Kaler et al. |
| 6,996,776 B1 | 2/2006 | Makely et al. |
| 6,996,781 B1 | 2/2006 | Myers et al. |
| 7,003,722 B2 | 2/2006 | Rothchiller et al. |
| 7,010,580 B1 | 3/2006 | Fu et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,080,083 B2 | 7/2006 | Kim et al. |
| 7,080,325 B2 | 7/2006 | Treibach-Heck et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,146,564 B2 | 12/2006 | Kim et al. |
| 7,152,205 B2 | 12/2006 | Day et al. |
| 7,168,035 B1 | 1/2007 | Bell et al. |
| 7,190,376 B1 | 3/2007 | Tonisson |
| 7,191,394 B1 | 3/2007 | Ardeleanu et al. |
| 7,213,200 B2 | 5/2007 | Abe et al. |
| 7,236,982 B2 | 6/2007 | Zlatanov et al. |
| 7,272,789 B2 | 9/2007 | O'Brien |
| 7,281,018 B1 | 10/2007 | Begun et al. |
| 7,296,017 B2 | 11/2007 | Larcheveque et al. |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,178 B1 | 2/2008 | Stanciu et al. |
| 7,346,610 B2 | 3/2008 | Ruthfield et al. |
| 7,350,141 B2 | 3/2008 | Kotler et al. |
| 2001/0007109 A1 | 7/2001 | Lange |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0054004 A1 | 12/2001 | Powers |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0013788 A1 | 1/2002 | Pennell et al. |
| 2002/0023113 A1 | 2/2002 | Hsing et al. |
| 2002/0026441 A1 | 2/2002 | Kutay et al. |
| 2002/0026461 A1 | 2/2002 | Kutay et al. |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0057297 A1 | 5/2002 | Grimes et al. |
| 2002/0065798 A1 | 5/2002 | Bostleman et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0100027 A1 | 7/2002 | Binding et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174147 A1 | 11/2002 | Wang et al. |
| 2002/0174417 A1 | 11/2002 | Sijacic et al. |
| 2002/0184219 A1 | 12/2002 | Preisig et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0004951 A1 | 1/2003 | Chokshi |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0026507 A1 | 2/2003 | Zlotnick |
| 2003/0037303 A1 | 2/2003 | Bodlaender et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe et al. |

| | | | | | | |
|---|---|---|---|---|---|---|
| 2003/0061386 A1 | 3/2003 | Brown | | 2004/0205653 A1 | 10/2004 | Hadfield et al. |
| 2003/0061567 A1 | 3/2003 | Brown et al. | | 2004/0205671 A1 | 10/2004 | Sukehiro et al. |
| 2003/0084424 A1 | 5/2003 | Reddy et al. | | 2004/0210599 A1 | 10/2004 | Friedman et al. |
| 2003/0093755 A1 | 5/2003 | O'Carroll | | 2004/0221238 A1 | 11/2004 | Cifra et al. |
| 2003/0120578 A1 | 6/2003 | Newman | | 2004/0221245 A1 | 11/2004 | Chickles et al. |
| 2003/0120651 A1 | 6/2003 | Bernstein et al. | | 2004/0237030 A1 | 11/2004 | Malkin |
| 2003/0120659 A1 | 6/2003 | Anandampillai | | 2004/0261019 A1 | 12/2004 | Imamura et al. |
| 2003/0120671 A1 | 6/2003 | Kim et al. | | 2004/0268229 A1 | 12/2004 | Paoli et al. |
| 2003/0120686 A1 | 6/2003 | Kim et al. | | 2005/0004893 A1 | 1/2005 | Sangroniz |
| 2003/0126555 A1 | 7/2003 | Aggarwal et al. | | 2005/0005248 A1 | 1/2005 | Rockey et al. |
| 2003/0128196 A1 | 7/2003 | Lapstun et al. | | 2005/0015279 A1 | 1/2005 | Rucker |
| 2003/0135825 A1 | 7/2003 | Gertner et al. | | 2005/0015732 A1 | 1/2005 | Vedula et al. |
| 2003/0140132 A1 | 7/2003 | Champagne et al. | | 2005/0022115 A1 | 1/2005 | Baumgartner et al. |
| 2003/0158897 A1 | 8/2003 | Ben-Natan et al. | | 2005/0027757 A1 | 2/2005 | Kiessig et al. |
| 2003/0163285 A1 | 8/2003 | Nakamura et al. | | 2005/0033728 A1 | 2/2005 | James |
| 2003/0167277 A1 | 9/2003 | Hejlsberg et al. | | 2005/0038711 A1 | 2/2005 | Marlelo |
| 2003/0182268 A1 | 9/2003 | Lal | | 2005/0055627 A1 | 3/2005 | Lloyd et al. |
| 2003/0182327 A1 | 9/2003 | Ramanujam et al. | | 2005/0060324 A1 | 3/2005 | Johnson et al. |
| 2003/0187756 A1 | 10/2003 | Klivington et al. | | 2005/0065933 A1 | 3/2005 | Goering |
| 2003/0187930 A1 | 10/2003 | Ghaffar | | 2005/0065936 A1 | 3/2005 | Goering |
| 2003/0188260 A1 | 10/2003 | Jensen et al. | | 2005/0066287 A1 | 3/2005 | Tattrie et al. |
| 2003/0189593 A1 | 10/2003 | Yarvin | | 2005/0071752 A1 | 3/2005 | Marlatt |
| 2003/0192008 A1 | 10/2003 | Lee | | 2005/0076049 A1 | 4/2005 | Qubti et al. |
| 2003/0200506 A1 | 10/2003 | Abe et al. | | 2005/0091285 A1 | 4/2005 | Krishnan et al. |
| 2003/0204511 A1 | 10/2003 | Brundage | | 2005/0091305 A1 | 4/2005 | Lange et al. |
| 2003/0204814 A1 | 10/2003 | Elo et al. | | 2005/0102370 A1 | 5/2005 | Lin et al. |
| 2003/0205615 A1 | 11/2003 | Marappan | | 2005/0102612 A1 | 5/2005 | Allan et al. |
| 2003/0212664 A1 | 11/2003 | Breining et al. | | 2005/0108104 A1 | 5/2005 | Woo |
| 2003/0217053 A1 | 11/2003 | Bachman et al. | | 2005/0108624 A1 | 5/2005 | Carrier |
| 2003/0220930 A1 | 11/2003 | Milleker et al. | | 2005/0114757 A1 | 5/2005 | Sahota et al. |
| 2003/0225469 A1 | 12/2003 | DeRemer et al. | | 2005/0138086 A1 | 6/2005 | Pecht-Seibert |
| 2003/0225768 A1 | 12/2003 | Chaudhuri | | 2005/0171746 A1 | 8/2005 | Thalhammer-Reyero |
| 2003/0225829 A1 | 12/2003 | Pena et al. | | 2005/0198086 A1 | 9/2005 | Moore |
| 2003/0226132 A1 | 12/2003 | Tondreau et al. | | 2005/0198125 A1 | 9/2005 | Beck et al. |
| 2003/0233374 A1 | 12/2003 | Spinola et al. | | 2005/0198247 A1 | 9/2005 | Perry et al. |
| 2003/0233644 A1 | 12/2003 | Cohen et al. | | 2005/0223063 A1 | 10/2005 | Chang et al. |
| 2003/0236859 A1 | 12/2003 | Vaschillo et al. | | 2005/0223320 A1 | 10/2005 | Brintzenhofe et al. |
| 2003/0237046 A1 | 12/2003 | Parker et al. | | 2005/0268222 A1 | 12/2005 | Cheng |
| 2003/0237047 A1 | 12/2003 | Borson | | 2006/0020586 A1 | 1/2006 | Prompt et al. |
| 2004/0002939 A1 | 1/2004 | Arora | | 2006/0026534 A1 | 2/2006 | Ruthfield et al. |
| 2004/0003031 A1 | 1/2004 | Brown et al. | | 2006/0031757 A9 | 2/2006 | Vincent, III |
| 2004/0003353 A1 | 1/2004 | Rivera et al. | | 2006/0036995 A1 | 2/2006 | Chickles et al. |
| 2004/0003389 A1 | 1/2004 | Reynar et al. | | 2006/0041838 A1 | 2/2006 | Khan |
| 2004/0010752 A1 | 1/2004 | Chan et al. | | 2006/0059434 A1 | 3/2006 | Boss et al. |
| 2004/0024842 A1 | 2/2004 | Witt | | 2006/0069605 A1 | 3/2006 | Hatoun |
| 2004/0030991 A1 | 2/2004 | Hepworth et al. | | 2006/0069985 A1 | 3/2006 | Friedman et al. |
| 2004/0039990 A1 | 2/2004 | Bakar et al. | | 2006/0085409 A1 | 4/2006 | Rys et al. |
| 2004/0039993 A1 | 2/2004 | Kougiouris et al. | | 2006/0101037 A1 | 5/2006 | Brill et al. |
| 2004/0044961 A1 | 3/2004 | Pesenson | | 2006/0143220 A1 | 6/2006 | Spencer |
| 2004/0044965 A1 | 3/2004 | Toyama et al. | | 2006/0161559 A1 | 7/2006 | Bordawekar et al. |
| 2004/0054966 A1 | 3/2004 | Busch et al. | | 2007/0036433 A1 | 2/2007 | Teutsch |
| 2004/0059754 A1 | 3/2004 | Barghout et al. | | 2007/0050719 A1 | 3/2007 | Lui et al. |
| 2004/0073565 A1 | 4/2004 | Kaufman et al. | | 2007/0061467 A1 | 3/2007 | Essey et al. |
| 2004/0073868 A1 | 4/2004 | Easter et al. | | 2007/0061706 A1 | 3/2007 | Cupala |
| 2004/0078756 A1 | 4/2004 | Napper et al. | | 2007/0074106 A1 | 3/2007 | Ardeleanu et al. |
| 2004/0083426 A1 | 4/2004 | Sahu | | 2007/0094589 A1 | 4/2007 | Paoli |
| 2004/0088647 A1 | 5/2004 | Miller et al. | | 2007/0100877 A1 | 5/2007 | Paoli |
| 2004/0093596 A1 | 5/2004 | Koyano | | 2007/0101280 A1 | 5/2007 | Paoli |
| 2004/0107367 A1 | 6/2004 | Kisters | | 2007/0118803 A1 | 5/2007 | Walker et al. |
| 2004/0117769 A1 | 6/2004 | Lauzon et al. | | 2007/0130504 A1 | 6/2007 | Betancourt et al. |
| 2004/0123277 A1 | 6/2004 | Schrader et al. | | 2007/0208606 A1 | 9/2007 | MacKay et al. |
| 2004/0146199 A1 | 7/2004 | Berkner et al. | | 2007/0208769 A1 | 9/2007 | Boehm et al. |
| 2004/0163041 A1 | 8/2004 | Engel | | | | |
| 2004/0172442 A1 | 9/2004 | Ripley | | | FOREIGN PATENT DOCUMENTS | |
| 2004/0186762 A1 | 9/2004 | Beaven et al. | | | | |
| 2004/0189716 A1 | 9/2004 | Paoli et al. | | EP | 0961197 | 12/1999 |
| 2004/0194035 A1 | 9/2004 | Chakraborty | | EP | 1076290 | 2/2001 |
| 2004/0205473 A1 | 10/2004 | Fisher et al. | | EP | 1221661 | 7/2002 |
| 2004/0205525 A1 | 10/2004 | Murren et al. | | JP | 3191429 | 1/1900 |
| 2004/0205534 A1 | 10/2004 | Koelle | | JP | 63085960 | 4/1988 |
| 2004/0205571 A1 | 10/2004 | Adler | | JP | 401173140 A | 7/1989 |
| 2004/0205592 A1 | 10/2004 | Huang | | JP | 4225466 | 8/1992 |
| 2004/0205605 A1 | 10/2004 | Adler et al. | | JP | 5314152 | 11/1993 |

| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 9/2006 |

OTHER PUBLICATIONS

"Architecture for a Dynamic Information Area Control" IBM Technical Disclosure Bulletin IBM Corp. New York US vol. 37 No. 10 Jan. 10, 1994. pp. 245-246.

Alschuler Liora; "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.

Au Irene et al.; "Netscape Communicator's Collapsible Toolbars" CHI'98 Human Factors in Computing Systems Conference Proceedings Los Angeles CA Apr. 18-23, 1998 pp. 81-86.

Battle Steven A. et al.; "Flexible Information Presentation with XML" 1998 The Institution of Electrical Engineers 6 pages.

Brogden William; "Arbortext Adept 8 Editor Review" O'Reilly XML.COM 'Online! Sep. 22, 1999 XP002230080 retrieved from the Internet <URL:http://www.xml.com/pub/a/1999/09/adeptRvw.htm> retrieved on Feb. 5, 2003.

Chen Yi et al.: A; "XKvalidator: A Constraint Validator for XML" CIKM '-2 Nov. 4-9, 2002, Copyright 2002 ACM 1-58113-492-4/02/0011 pp. 446-452.

Ciancarini Paolo et al.; "Managing Complex Documents Over the WWW: A Case Study for XML" IEEE Transactions on Knowledge and Data Engineering vol. 11 No. 4 Jul./Aug. 1999. pp. 629-938.

Davidow< ARI SML Editors: Alle; "XML Editors: Allegations of Functionality in search of reality" Internet 'Online! 1999 XP002230082 retrieved from the Internet <URL:http://www.ivritype.com/xml/>.

Kanemoto Hirotaka et al; "An Efficiently Updatable Index Scheme for Structured Documents" 1998 IEEE pp. 991-996.

Sutanthavibul Supoj et al.; "XFIG Version 3.2 Patchlevel 2 (Jul. 2, 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].

Usdin Tommie et al.: Not a; "XML: Not a Silver Bullet But a Great Pipe Wrench" Standardview vol. 6 No. 3 Sep. 1998 pp. 125-132.

Haukeland Jan-Henrick; "Tsbiff—tildeslash biff—version 1.2.1" Internet Document [Online] Jun. 1999 URL: http://web.archive.org/web/19990912001527/http://www.tildeslash.com/tsbiff/.

"Netscape window" Netscape Screenshot Oct. 2, 2002.

Dyck Timothy; "XML Spy Tops as XML Editor" http://www.eweek.com/article2/0395972404100.asp Nov. 25, 2002 4 pages.

Chien Shu-Yao et al.; "Storing and Querying Multiversion XML Documents using Durable Node Numbers" IEEE 2002 pp. 232-241.

Chien Shu-Yao et al. ; Efficient Management of Multiversion Documents by Object Referencing Proceedings of the 27th VLDB Conference 2001 pp. 291-300.

Chien Shu-Yao et al.; "Efficient schemes for managing multiversion XML documents" VLDB Journal (2002) pp. 332-352.

Wong Raymond K. et al.; "Managing and Querying Multi-Version XML Data with Update Logging" DocEng '02 Nov. 8-9, 2002 Copyright 2002 ACM 1-58113-594-7/02/0011 pp. 74-81.

Chien Shu-Yao et al.; "XML Document Versioning" SIGMOD Record vol. 30 No. 3 Sep. 2001 pp. 46-53.

Nelson Mark; "Validation with MSXML and XML Schema" Windows Developer Magazine Jan. 2002 pp. 35-38.

Rogge Bories et al.; "Validating MPEG-21 Encapsulated Functional Metadata" IEEE 2002 pp. 209-212.

Netscape Communication Corporation; "Netscape Communicator 4.61 for OS/2 Warp" Software 1999 The whole software release & "Netscape—Version 4.6 [en]-010615" Netscape Screenhot Oct. 2, 2002.

Cheng Ya Bing et al.; "Designing Valid XML Views" ER 2002 LNCS 2503 2002 Springer-Verlag Berlin Heidelberg 2002 pp. 463-477.

Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.

Dayton Linnea and Jack Davis P; "Photo Shop 5/5.5 WOW! Book" 2000 Peachpit Press pp. 8-17.

Hall Richard Scott; "Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.

Hardy Mathew R.B. et al.; "Mapping and Displaying Structural Transformations between XML and PDF" DocEng '02 Nov. 8-9, 2002, Copyright 2002 ACM 1-58113-597-7/02/0011 pp. 95-102.

Kim Sang-Kyun et al.; "Immediate and Partial Validation Mechanism for the Conflict Resolution of Update Operations in XML Databases" WAIM 2002 LNCS 2419 2002 pp. 387-396 Springer-Veriag Berlin Heidelberg 2002.

Netscape Communication Corp Sm; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.

Tomimori et al.; "An Efficient and Flexible Access Control Framework for Java Programs in Mobile Terminals"; 22nd International Conference on Distributed Computing Systems Workshops; 2002; pp. 777-782.

Van Hoff Arthur et al.; "The Open Software Description Format" Online Aug. 13, 1997 retrieved from the Internet on Nov. 7, 2003: <http://www.w3.org/TR/NOTE-OSD> 11 pages.

Verlamis Iraklis et al.; "Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.

Williams< Sara and Charlie Kin; "The Component Object Model" A Technical Overview Oct. 1994 Microsoft Corp. pp. 1-14.

Clarke P.; "From small beginnings" Knowledge Management Nov. 2001 pp. 28-30.

Hwang et al.; "Micro-Firewalls for Dynamic Network Security with Distributed Intrusion Detection"; IEEE INternational Symposium on Network Computing and Applications; 2001; pp. 68-79.

Kaiya et al.; "Specifying Runtime Environments and Functionalities of Downloadable Components Under the Sandbox Mode"; International Symposium on Principles of Software Evolution; 2000; pp. 138-142.

Komatsu N. et al.; "A Proposal on Digital Watermark in Document image Communication and Its Application to Realizing a Signature" Electronics and Communications in Japan Part I: Communications vol. 73 No. 5 May 1990 pp. 22-33.

Noore A.; "A secure conditional access system using digital signature and encryption" 2003 Digest of Technical Papers. International Conference on Consumer Electronics Jun. 2003 pp. 220-221.

Pacheco et al.; "Delphi 5 Developer's Guide" Sams Publishing 1999 Chapter 31 Section: Data Streaming 6 pages.

Prevelakis et al.; "Sandboxing Applications"; Proceedings of the FREENIX Track; 2001; pp. 119-126.

Rapaport L.; "Get more from SharePoint" Transform Magazine vol. 11 No. 3. Mar. 2002 pp. 1315.

Schmid et al.; "Protection Data from Malicious Software"; 18th Annual Computer Security Applications Conference; 2002; pp. 199-208.

Sun Q. et al.; "A robust and secure media signature scheme for JPEG images" Proceedings of 2002 IEEE Workshop on Multimedia Signal Processing Dec. 2002 pp. 296-299.

Clark James—W3C Editor; "XSL Transformation (XSLT) Verison 1.0" Nov. 16, 1999 W3C (MIT INRIA Kejo) pp. 1-156.

Description of Whitehill Composer software product producted by Whitehill Technologies Inc. available at <http://www.xml.com/pub/p/221> accessed on Apr. 8, 2004 two pages.

McCright J.S.; "New Tool Kit to Link Groove with Microsoft Sharepoint" eWeek Enterprise News & Reviews Ziff Davis Media INc. Jul. 29, 2002 1 page.

Musgrave S; "Networking technology—impact and opportunities" Survey and Statistical Computing 1996. Proceedings of the Second ASC International Conference. Sep. 1996. pp. 369-378. London UK.

W3C Editor James Calrk and Ste; "XML Path Language (XPath) Version 1.0" Nov. 16, 1999W3C (MIT INRIA Kejo) pp. 1-49.

U.S. Appl. No. 60/191,662, Kutay et al.

U.S. Appl. No. 60/203,081, Ben-Natan et al.

"Store and Organize Related Project Files in a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM-Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Zdonik S., "Object Management System Concepts," ACM, 1984, pp. 13-19.

Trupin J., "The Visual Programmer," Microsoft Systems Journal, Apr. 1996, pp. 103-105.

OMG XML Metadata Interchange (XMI) Specification Version 1.2 Jan. 2002.

Laura Acklen & Read Gilgen, "Using Corel Wordperfect 9". 251-284, 424-434, 583-586 (1998).

Bruce Halberg et al, "Using Microsoft Excel 97". Published 1997, Bestseller Edition, Pertinent pp. 1-9, 18-25, 85-89, 98-101, 106-113, 124-127, 144-147, 190-201, 209-210, 218-227, 561-590, 632-639, 650-655, 712-714.

Leblond et al, "PC Magazine Guide to Quattro Pro for Windows", pp. 9-11, 42-61, Ziff-Davis Press, Copyright 1983 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

IBM; Stack Algorithm for Extractin Subtree from Serialized Tree, Mar. 1, 1994, TDB-ACC-NONN94033. 3 pages.

Atova, "User Reference manual Version 4.4, XML Spy suite 4.4," Atova Ges.m.b.H and Altova, Inc., May 24, 2002, pages cover, copyright page, 1-565.

Altova et al. XML Spy, XML integrated Development Environments, Altova Inc., 2002, pp. 1-18.

Ben-Natan, U.S. Appl. No. 60/203,081, filed 5/9/2000, entitled "Internet platform for creating and supporting communities".

Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.

Kutay, U.S. Appl. No. 60/209,713, filed Jun. 5, 2005, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

Altova, Inc., "XML Spy 4.0 Manual," Altova Inc. & Altova GmbH, coyright 1998-2001, Chapters 1, 2, and 6, encompassing pp. 1-17, 18-90, and 343-362.

Cybook, Inc.: "Copying the Search Form to Services-based Web Sites" INternet Article, (online) Jul. 26, 2004.*the whole document*.

Excel Developer Tip (hereinafter "Excel"), "Determining the Data Type of a Cell", May 13, 1998, p. 1 (available at http://jwalk.com/ss//excel/tips/tip62.htm).

Macromedia, Inc.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document .

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 07.

Microsoft Corporation, "Microsoft Computer Dictionary" Microsoft Press, Fifth Edition, p. 149.

Borland, Russo "Running Microsoft Word 97", 314-315, 338, 361-362, 390, and 714-719.

"Microsoft Word 2000", Screenshots,(1999),1-5.

Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office. 11,6=printer).aspx on Jan. 21, 2007,(Aug., 2004).

Dubinko, Micah "XForms and Microsoft InfoPath", Retrieved from the Internet at http://www.xml.com/lpt/a/1311 on Jan. 21, 2007,(Oct. 29, 2003).

Udell, Jon "InfoPath and XForms", Retrieved from the Internet at http://weblog.infoworld.com/udell/2003/02/26.html,(Feb. 26, 2003).

Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Singh, Darshan "Microsoft InfoPath 2003 By Example", Retrieved from the Internet at http://www.perfectxml.com/InfoPath.asp on Jan. 21, 2007,(Apr. 20, 2003).

Raman, T.V., et al., "XForms 1.0", (Dec. 2001),Section 1-12.2.3 & Appendices A-G.

"Enter Key", Retrieved from the Internet at http://systems.webopedia.com/TERM/Enter_key.html on Dec. 20, 2006.

Lehtonen, Miro et al., "A Dynamic User Interface for Document Assembly", Department of Computer Science, University of Helsinki,(Nov. 2002).

Rees, Michael J., "Evolving the Browser Towards a Standard User Interface Architecture", School of Information Technology, Bond University, Australia,(2001).

"Microsoft Visual Basic 5.0 Programmer's Guide", *Microsoft Press*, (1997),pp. 42-43, 54-58.

Nelson, Joe "Client-side Form Validation Using JavaScript", *Developer Advisory*, (Sep. 21, 2001).

Brabrand, et al., "Power Forms Declarative Client-side Form Field Validation", (2002),1-20.

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001, 1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://wwww2002.org/CDROM/refereed/321, Printed on May 18, 2007,(May 2002),25 pages.

"Microsoft Word 2000 Screenshots", (2000),11-17.

Pacheco, Xavier et al., "Delphi 5 Developer's Guide", Sams Publishing. Chapter 31, Section: Data Streaming,(1999),4.

XMLSPY, "XmlSpy 2004 Enterprise Edition Manual", Altova,(May 17, 2004),1-25, 220-225.

Stylusstudio, "StylusStudio: XPath Tools", 2004-2007, StylusStudio, 1-14.

Dodds, "Toward an XPath API", xml.com,(May 7, 2001),1-3.

Altova, "Altova Tools for XPath 1.0/2.0", Altova, 1-12.

"Microsoft Word 2000 Screenshots", Word,(2000),1-17.

Grosso, et al., "XML Fragment Interchange", W3C,(Feb. 2001),1-28.

Altova, et al., "User and Reference Manual Version 4.4", www.xmlspy.com, (May 24, 2007),1-565.

"XForm 1.0", W3C,(Jul. 16, 2001).

* cited by examiner

300

302

Interest in continued learning     ○ ○ ○ ● ○ ○
Average rating  4.2

○ Click here to insert the Clerical Skills section
○ Click here to insert the Managerial Skills section
○ Click here to insert the Technical Skills section

Comments

Applicant Strengths:
Master's degree from Harvard.

Applicant Weaknesses:
No experience in this field.

Comments:
Position applied for has an excellent manager that is willing and able to train, so lack of experience is probably okay.

Hiring Recommendation

○ No recommendation  ○ Don't hire  ● Hire

304

Click here to sign this section

Fig. 3

DIGITAL SIGNATURE WITH AN EMBEDDED VIEW

CROSS REFERENCE TO RELATED PATENT APPLICATION

This is a divisional of and priority is claimed to co-pending U.S. patent application having Ser. No. 10/846,428 and a filing date of May 13, 2004 for DIGITAL SIGNATURES WITH AN EMBEDDED VIEW of Catorcini, et al. This co-pending United States Patent Application is commonly assigned herewith and is hereby incorporated herein by reference for all that it discloses.

TECHNICAL FIELD

This invention relates to digital signature methods and systems.

BACKGROUND

Digital signatures are valid substitutes to traditional inked signatures in many countries. Digital signatures, like inked signatures, may be used as evidence to show that a particular body of data was signed.

Typical digital signatures allow a signer to electronically sign data and be reasonably certain that the data will not change. Thus, data having a digital signature is locked; it cannot be altered without invalidating the digital signature. Because of this, a digital signature can be used as evidence to show that the data locked by the digital signature was signed and has not been altered since it was signed.

While the data may not change since it was signed, how the data is presented can change with some types of electronic documents. Data presented in one way may be substantially different to the viewer than when presented in another. Important data can be shown with a large font that is easily seen in one presentation, for instance, but in another be shown in a small-font footnote.

This can be a significant problem for types of digital signatures that do not preserve the view of the data when signed. These types of digital signatures will not show how the data was presented when signed, making them less reliable evidence. Thus, while digital signatures typically lock the data that is signed, some types of digital signatures do not lock or preserve the view of the data when it was signed.

Some other types of digital signatures, however, preserve the view of the data when it was signed using a link to the view at a remote website. Here the data of the digital signature can be presented in other ways after the data is signed, but the view seen by the signer is preserved, at least initially, through this remote website.

These digital signatures suffer from significant drawbacks. First, the view stored in the remote website may not be valid or exist when the digital signature is later used as evidence. In many real-world situations, a digital signature may need to be used as evidence ten, twenty, or even thirty years from when it was signed. The view initially preserved at the remote website may not exist then. Second, the view, even if it exists, may not be readily available, such as when the remote website cannot be readily accessed.

Another type of digital signature partially addresses this drawback but it suffers from another problem. This type of digital signature combines the view of the data when signed and the data itself. But combining the data and the view prevents the data from being read by a machine. Because the data is not machine readable, it cannot be repurposed, which significantly limits the usefulness of this type of digital signature.

Given the foregoing, there is a need in the art for a digital signature that can permit signed data to be repurposed and that can also include the view when signed.

SUMMARY

A digital signature and related methods and systems providing an embedded view of signed and repurposable data is described. Allowing signed data to be repurposed permits the signed data to be reused, allowing, for instance, other individuals to sign different portions of the signed data or the same signed data in a different presentation.

A digital signature, as disclosed herein, can also include embedded information sufficient to recreate the embedded view using the signed data. This information provides a check on the embedded view to further secure the digital signature.

BRIEF DESCRIPTION OF THE DRAWINGS

FIG. 3 illustrates a screen shot showing part of a signable data section of the electronic document.

The same numbers are used throughout the disclosure and figures to reference like components and features.

DETAILED DESCRIPTION

Overview

Digital signatures and related methods and systems described below can provide an embedded view of data when signed that locks the signed data and permits it to be repurposed. Allowing signed data to be repurposed permits the signed data to be reused, allowing, for instance, other individuals to sign different portions of the signed data or the same signed data in a different presentation. An embedded view makes a digital signature more secure by capturing the context that lead to the decision to sign, without having to rely on a potentially unreliable or unavailable view.

This embedded view captures how data is presented when a signer makes a decision to sign. By seeing data in a particular way, a signer makes a decision to sign or not sign. Because this embedded view shows how the data was presented to the signer at signing and the context in which the data is shown, this embedded view can be important in establishing what the signer intended to sign.

These digital signatures may also include other embedded information that further secures the digital signature. Information sufficient to recreate the computer environment with which the embedded view was viewed, for instance, may be embedded to provide additional context for the embedded view. With this information (called "meta information"), a court of law can determine what computer environment is needed to recreate what a signer viewed at signing. The court can then recreate what the signer viewed by presenting the embedded view with this computer environment.

Comments, custom information, and the like also may be embedded to further secure and provide context for the digital signature.

Described below are these and other exemplary digital signatures and related methods and systems for building and using them.

Exemplary Electronic Document and Signature Blocks

Figure 1:
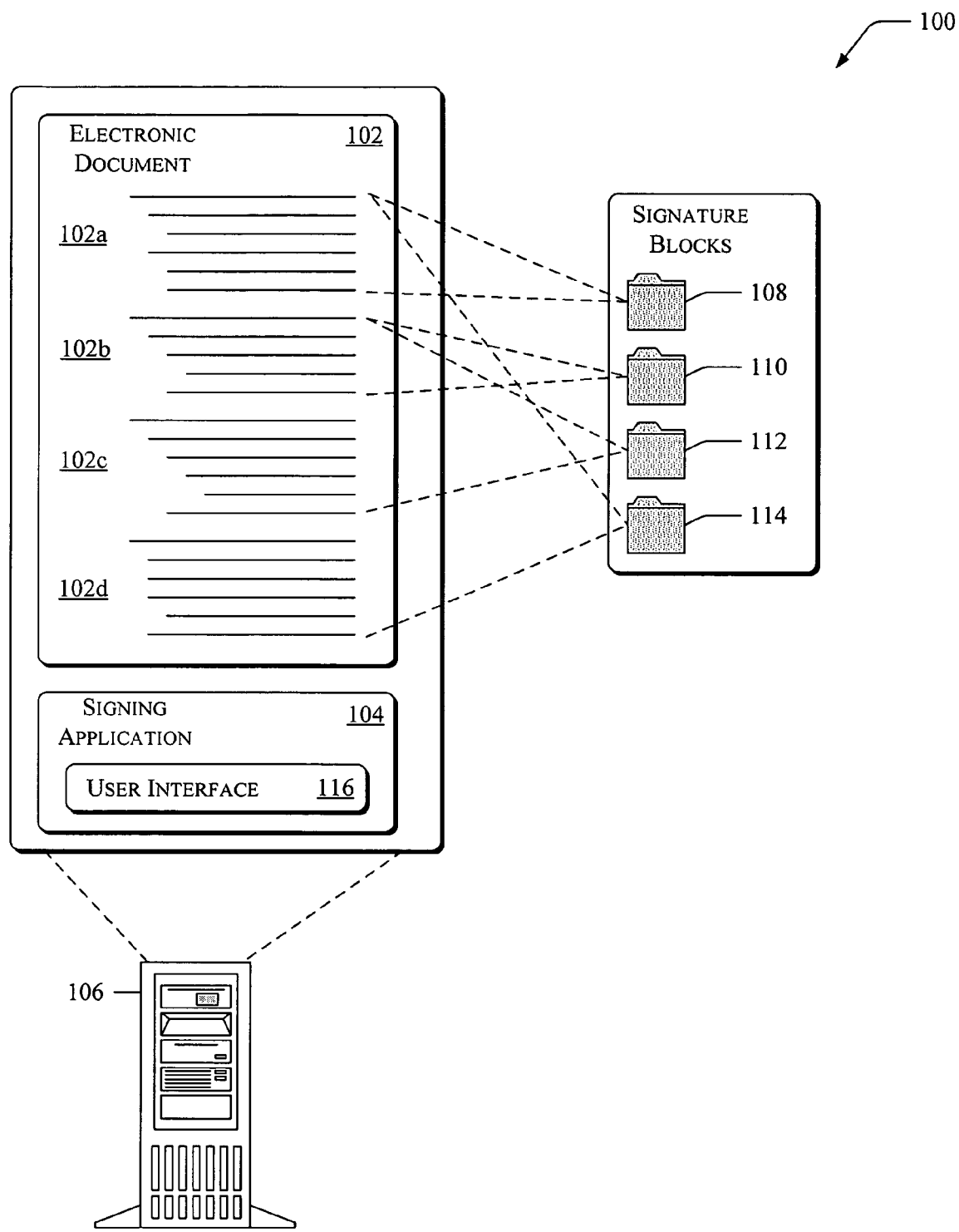
FIG. 1 illustrates an exemplary architecture having an exemplary electronic document and signing application.

Referring to FIG. 1, an exemplary architecture 100 is shown having an electronic document 102 and signing application 104 accessible by a computer 106. This architecture 100 and its components are shown to aid in discussing, but are not intended to limit the applicability of, the digital signatures and their related methods.

In this architecture 100, the electronic document 102 is hierarchically structured and written using a tag-based language. In one embodiment, this language comprises eXtensible Markup Language (XML), though other structures and languages may be used. It is shown divided into signable data sections 102a, 102b, 102c, and 102d, each of which relates to various signature blocks 108, 110, 112, and 114, these relationships shown with dashed lines. These signature blocks are as yet unsigned, but are shown related to those data sections that they can lock once signed. These signature blocks can be structured to conform to the XML Signatures standard currently prescribed by the World Wide Web Consortium (W3C).

The signing application 104 comprises a user interface 116 (though this user interface 116 can be separate from the signing application 104), which can be used to aid a potential signer in signing a digital signature.

Creating Digital Signatures

Figure 2:
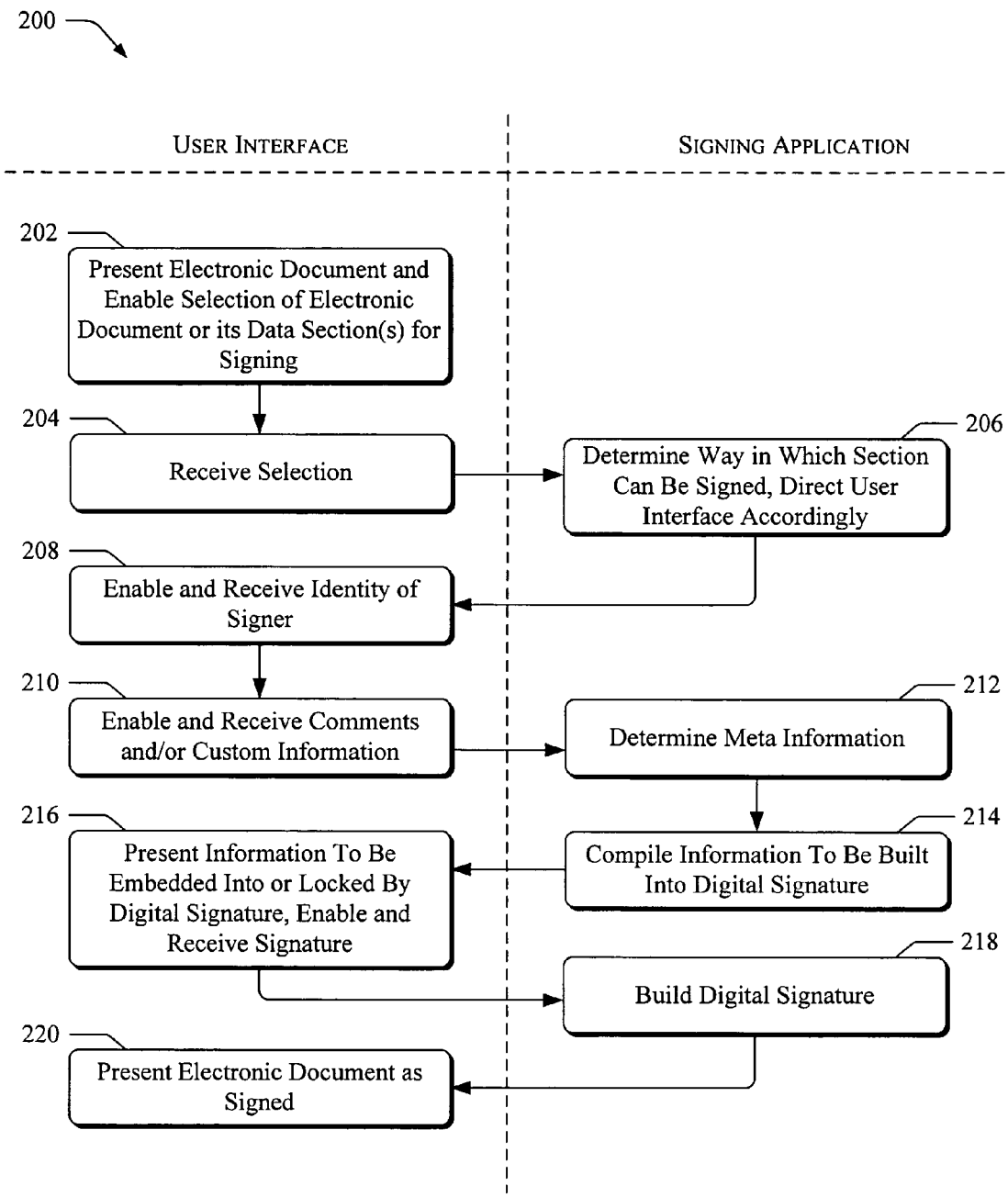
FIG. 2 sets forth a flow diagram of an exemplary process for creating digital signatures in part by interacting with a potential signer.

Referring to FIG. 2, an exemplary process 200 for creating digital signatures is shown. The process 200 is illustrated as a series of blocks representing individual operations or acts performed by the signing application 104 and the user interface 116. This and other processes described herein may be implemented in any suitable hardware, software, firmware, or combination thereof, including computer-readable media having computer-readable instructions stored thereon. In the case of software and firmware, these processes represent sets of operations implemented as computer-executable instructions.

At block 202, an electronic document capable of being signed is presented to a potential signer. In an ongoing embodiment, the user interface 116 presents the electronic document 102 and enables selection of data sections 102a, 102b, 102c, and 102d for signing. The user interface 116 can present the electronic document 102 by transforming the XML into viewable HTML (Hyper Text Machine Language) using an XSLT (eXtensible Stylesheet Language Transformation) file or other suitable technique.

Referring to FIG. 3, a screen shot 300 showing a portion 302 of the electronic document 102 is shown. This portion 302 shows a view of part of the signable data section 102a of the electronic document 102 and a selector 304 by which a user can select to sign this data section 102a. The user can select to sign just the data section 102a, just the data section 102b, both the data sections 102b and 102c at once, or all of the data sections at once. This array of choices is enabled in this embodiment by the signature blocks 108, 110, 112, and 114. In the ongoing embodiment, the user selects to sign just the data section 102a.

At block 204 of FIG. 2, an intention to sign the presented electronic document or its data section is received. In the ongoing embodiment, the user interface 116 receives a selection of the data section 102a.

At block 206, a way in which the presented electronic document or its data section can be signed is determined. In the ongoing embodiment, the signing application 104 determines in which way the selected section can be signed by analyzing the signature block 108. The signature block 108 can set forth that this data section 102a can be signed by only one person, by multiple persons as co-signers, or by multiple persons as counter-signers. It can also set forth that this data section 102a permits a digital signature having meta information, comments, and custom data, for instance. The signing application 104 directs the user interface 116 according to the ways in which the selected section can be signed. In this embodiment, the user interface 116 follows blocks 208, 210 and 216 based on this direction from the signing application 104.

At block 208, a signer's identity is selected and received. In the ongoing embodiment, the user interface 116 enables selection of and receives the identity of the signer. The signer's identity can be represented by a private key in a infrastructure (PKI) certification or another suitable technique. In one embodiment, a person selecting a signer's identity can be different from that person's own identity. Thus, a person selecting the signer's identity can be acting as an agent for the signer, such as an assistant acting as an agent for his or her boss.

Figure 4:
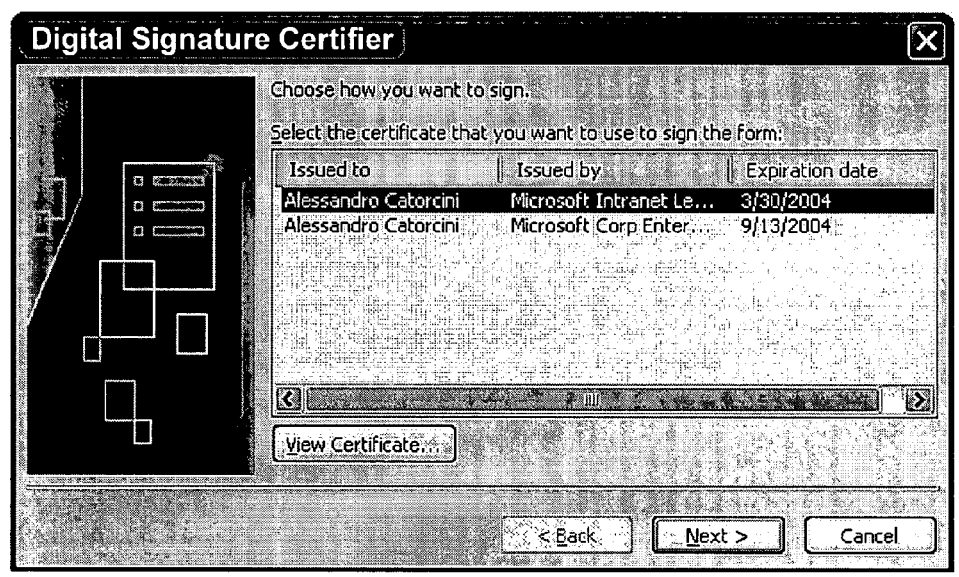
FIG. 4 illustrates an exemplary certification dialog box.

Referring to FIG. 4, a dialog box for certificate selection 400 presented by the user interface 116 is shown. Here the signer chooses a way by which his or her identity is certified.

At block 210 of FIG. 2, comments and/or custom information are enabled and received. In the ongoing embodiment, the user interface 116 enables the user to add comments. Comments or custom information can be received from sources other than the user, which will be described in greater detail below.

Figure 5:
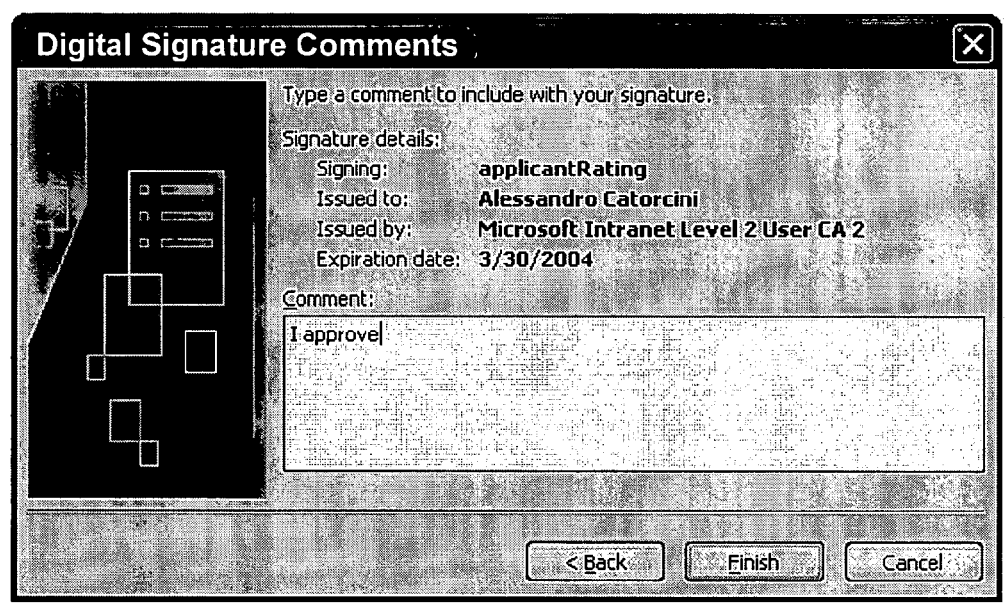
FIG. 5 illustrates an exemplary comment dialog box.

Referring to FIG. 5, a comment dialog box 500 presented by the user interface 116 is shown. Here the signer adds comments, if desired. Comments can help aid in analyzing a digital signature by adding context or otherwise setting the expressed intent of the signer. In this case, the signer simply comments that he approves of the applicant by his signature. In other cases, a signer might comment that he or she has reservations about some particular aspect of a document or data section he or she is signing. The user interface 116 can also present custom information options to the user (not shown), such as selecting a time stamp from a website, determining a location of the user with a global position device, and the like. This custom information can also be embedded in the digital signature to further secure and provide context for the digital signature.

At block 212 of FIG. 2, information sufficient to recreate the view currently seen of the data intended to be signed is determined. In the ongoing embodiment, the signing application 104 determines what computer environment is necessary to recreate the view of the data section 102a currently presented to the potential signer. This environment is described with information about the computer's software and/or hardware and is called "meta information". Using this meta information, a view embedded in the digital signature can later be verified by recreating that view from the data with the described computer environment.

At block 214, information that can be built into or locked by the digital signature is arranged or compiled. In the ongoing embodiment, the signing application 104 compiles the information that will be built into the digital signature if the user signs the data section 102a. The signing application 104 compiles information received by the user interface 116, such as comments from the signer and the signer's identity. The signing application 104 also compiles other information, such as the meta information, in some cases custom information, and/or a static image of the view currently seen by the user.

At block 216, information that can be embedded into or locked by the digital signature is presented and the signature enabled and received. In the ongoing embodiment, the user interface 116 presents information that will be embedded into and locked by the digital signature if the user signs the data section 102a. In this embodiment, the information comprises the user's PKI certification, the meta information, the comments, and the static image of the view of the data section 102a and the other information shown at the moment signed. The static image can comprise data and information other than that which is signed so long as what is and is not signed in the static view can be differentiated.

In one embodiment, the static image comprises just the data signed, here the data section 102a. In another embodiment, the static image comprises additional data, such as all the data of the electronic document 102.

Figure 6:
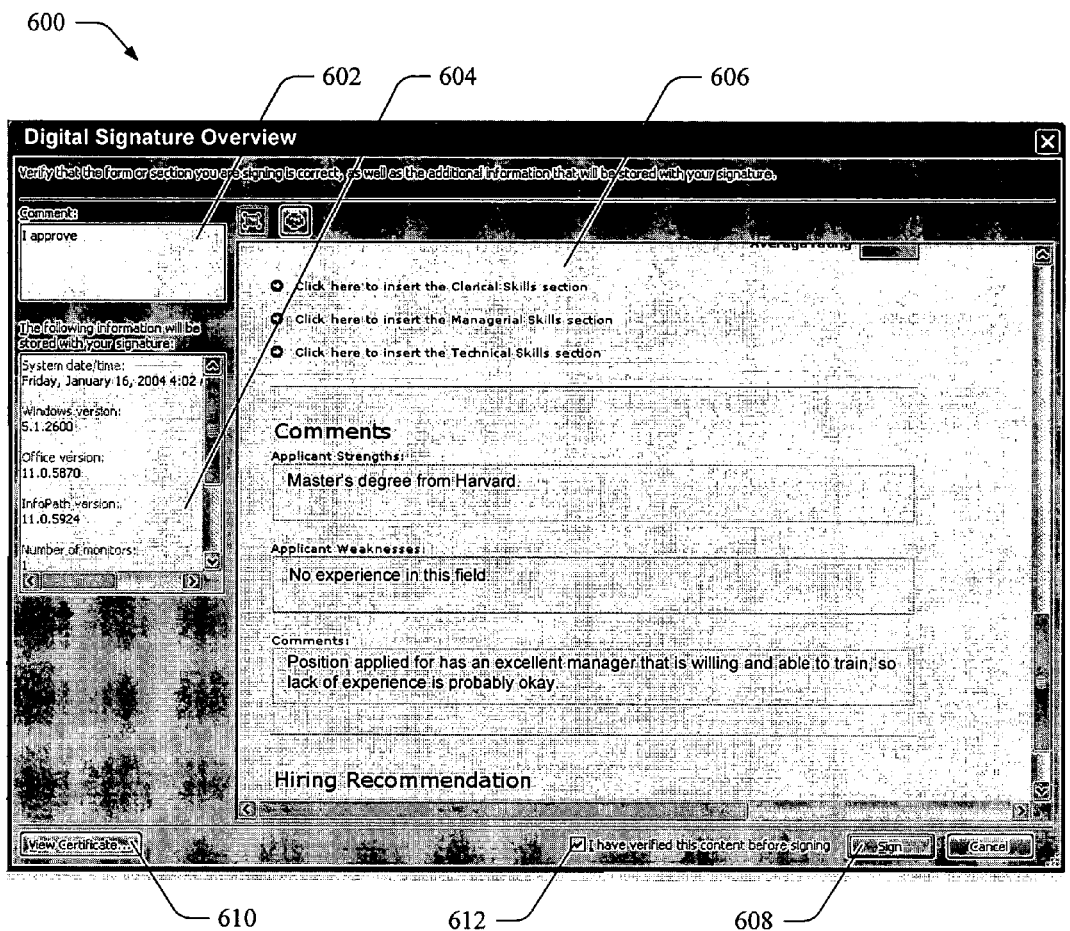
FIG. 6 illustrates an exemplary signing overview dialog box showing exemplary information that can be embedded into a digital signature.

Referring to FIG. 6, information that can be embedded in the digital signature, should the user sign, is presented by the user interface 116 using a signing overview dialog box 600. The user interface 116 presents the comment at 602, the meta information at 604, and the static image at 606. The user can choose to sign the digital signature by selecting a sign button 608. The user can choose to view the certificate by selecting a view certificate button 610. Prior to selecting the sign button 608, the user can select a confirmation checkbox 612, thereby recording that the user has verified the content of the overview dialog box 600 prior to signing.

As part of this presentation, the user interface 116 enables the user to check over the presented information, verify the content, and sign the digital signature.

At block 218 of FIG. 2, a digital signature with an embedded view of the data at signing that locks the signed data but permits the signed data to be repurposed is built. In the ongoing embodiment, the signing application 104 builds the digital signature by embedding the information into the digital signature that was presented to the signer with the signature overview dialog box 600. This digital signature comprises an embedded, static image 606 of the view of the data section 102a that the signer viewed and selected to sign. This static image 606 secures the digital signature by showing in what way and to what extent the data section 102a was presented to the signer. In one embodiment, the static image 606 does not show all of the data section 102a. In this case the static image 606 shows the view presented to the signer of the data section 102a, though this view can show less than all of the data of the data section 102a.

Also in this ongoing embodiment, the digital signature comprises meta information 604 sufficient to recreate the computer environment by which the signer viewed the data section 102a. This meta information 604 provides an additional check, or a stand-alone check if no static image is embedded, on the view of the data section 102a seen by the signer.

Again in this embodiment, the digital signature comprises the comment 602 added by the signer. This comment 602 further secures and/or provide context for the signer's choice to sign the data section 102a.

At block 220 of FIG. 2, the signed electronic document and/or data section is presented. In the ongoing embodiment, the user interface 116 presents the electronic document 102 showing the data section 102a as signed and by whom. The data section 102a is locked by the digital signature, and the electronic document 102 and the data section 102a are repurposable. In some embodiments, all of the other data of the electronic document 102 (the data 102b, 102c, and 102d) can be changed without breaking the digital signature on the data section 102a, while the data section 102a can be repurposed but not changed. Thus, other people can view and change the electronic document 102 except for the data section 102a. They can also view, reuse, and re-present the data section 102a. They can view the signed data section 102a as seen by the signer by viewing the static image 606, which is embedded in the digital signature. They can also co-sign or countersign the signed data section 102a (as permitted by the signature block 108). This digital signature can also insure that the data section 102a that is signed by a co-signer or counter-signer is identical to that signed by the first signer.

For documents that have many sections and need many signatures, especially if these sections and signatures overlap, this embodiment of the digital signature enables efficient reviewing and signing. A later signer of all of the data sections of the electronic document 102, for instance, knows that if the data section 102a is signed, that he or she is signing data that is identical to that which was previously signed. In some cases this is very important. For example, a CEO of a company may need to sign all of a document, but before doing so wants to know if what he is signing has already been signed by other appropriate persons. If data section 102a is related to safety standards, the CEO may want to know that the head engineer of the company has signed this data section 102a before the CEO signs the entire electronic document 102. The CEO also may want to be sure that the data section 102a has not changed since it was signed. In this embodiment, the CEO can be sure that the data signed by the head engineer has been signed and has not changed. Because this digital signature permits signed data to be read by machines, and thus be repurposed, the CEO can view the data section 102a as seen by the engineer at signing, or repurpose the data section 102a to see it in another view. When the CEO signs the whole document (here following the signature block 114) he can be signing data that has previously been signed (the data section 102a) and data that has not (e.g., the data section 102d).

Figure 7:
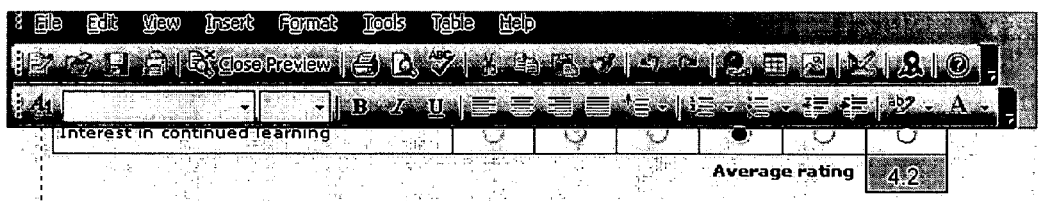
FIG. 7 illustrates a screen shot showing part of a signable data section that has been signed.

Referring to FIG. 7, the user interface 116 presents a view 700 of the data section 102a of the electronic document 102. The data section 102a is shown with an indication that it has been signed with text and an icon, shown at 702. Data within the data section 102a is locked; thus, the comments and hiring recommendation shown at 704 and 706 cannot be changed without breaking the signature shown at 702. Each signature block can permit a single signature, co-signatures, or counter-signatures for each data section to which it pertains. In this embodiment, another signature of the data section 102a is not permitted by the signature block 108, and so a choice to add another signature is not enabled at this location. Elsewhere in the electronic document 102, a signature can be enabled of all of the electronic document 102, the data section 102b, or the data sections 102b and 102c at once, as prescribed by the signature blocks 110, 112, and 114.

An exemplary method by which the signing application 104 can build digital signatures and exemplary structures for these digital signature are set forth below.

Exemplary Method for Building Digital Signatures

Figure 8:
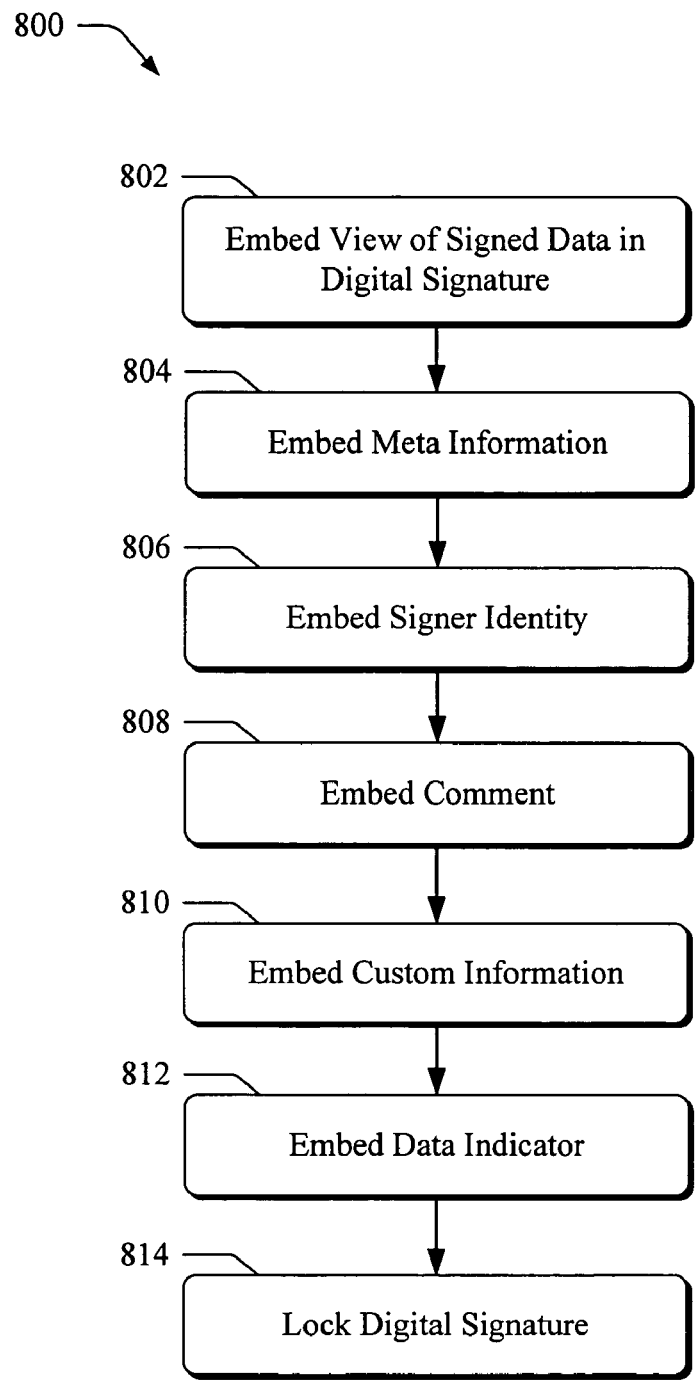
FIG. 8 sets forth a flow diagram of an exemplary process for building digital signatures.

Referring to FIG. 8, an exemplary process 800 for building digital signatures is shown. This process 800 is illustrated as a series of blocks representing individual operations or acts performed by the signing application 104. This process 800 is an exemplary implementation of the block 218 of FIG. 2, though this process 800 can be implemented separately as a stand-alone process or otherwise not implemented as part of the process 200.

In one embodiment of the process 800, the signing application 104 builds a digital signature in part by embedding information into a signature block and then locking the embedded information. In other embodiments, however, information is embedded directly into a digital signature without first embedding it into a signature block. In still others, information is embedded into a signature block and locked, but other parts of the signature block are not locked and so remain changeable.

In each of the blocks 802, 804, 806, 808, 810, and 812, the signing application 104 can be embed information into a digital signature by embedding the information into a signature block. The signature block can then be locked, thereby creating a digital signature comprising the information embedded into the signature block.

At block 802, the signing application 104 embeds the view of the signed data into the digital signature. In one embodiment, the signing application 104 embeds information into one of the signature blocks 108, 110, 112, and 114 and then locks the embedded information. The data signed is the data to which the signature block pertains.

In the illustrated and described embodiment, the signature blocks 108, 110, 112, and 114 comprise XML selector (e.g., and XPath expression) indicating the data of the electronic document 102 on which a signature can be made. For example, the signature block 108 indicates the data section 102a as signable. Similarly, the signature block 114 indicates the data sections 102a, 102b, 102c, and 102d as signable together. These signature blocks can indicate what part is signable through the tree or subtree for the data section 102a of the hierarchically structured electronic document 102.

The view embedded by the signing application 104 can comprise a static image seen by the signer at signing. In the ongoing embodiment, the signing application 104 embeds the static image 606 into the signature block 108 as a portable network graphic (PNG) file.

Figure 9:
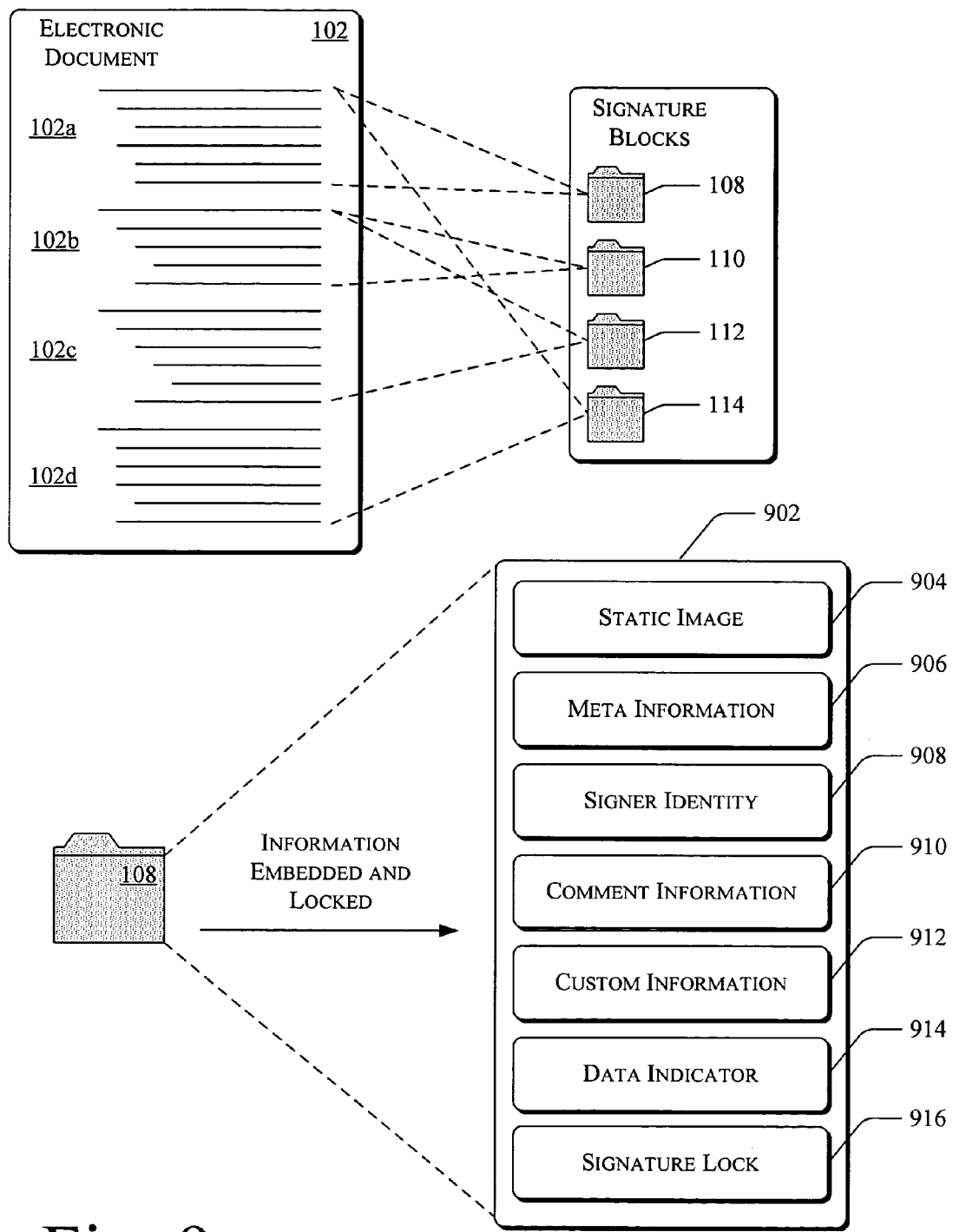
FIG. 9 illustrates an exemplary electronic document, signature blocks, and digital signature.

Referring to FIG. 9, an exemplary digital signature 902 is shown. This digital signature 902 is based on the ongoing example using the signature block 108 of FIG. 1. The digital signature 902 comprises the signature block 108, embedded information, and a locking element. Here the signing application 104 embeds the static image 606 within the digital signature 902 as a PNG file of an embedded static image 904.

At block 804 of FIG. 8, the signing application 104 embeds meta information sufficient to recreate the embedded view from the signed data. This meta information comprises specifications of the computer environment used by the signer to view the signed data, such as system date, time, and time-zone, the versions of the operating system and the signing application 104, system data (e.g., type of processor), number of monitors, type of monitors, type and/or version of image application that rendered the view, and/or the like.

Referring to FIG. 9, an embedded meta information 906 is shown. In the ongoing embodiment the embedded meta information 906 comprises the meta information 604: "System date/time: Friday, Jan. 16, 2004 4:02"; "Windows version: 5.1.2600"; "Office version: 11.0.5870"; "InfoPath version: 11.0.5924"; and "Number of monitors: 1."

At block 806 of FIG. 8, the signing application 104 embeds into the digital signature information sufficient to indicate the identity of the signer.

Referring to FIG. 9, an embedded signer identity 908 is shown. In the ongoing embodiment, the embedded identity 906 comprises a PKI certification issued by Microsoft™ and shown in FIG. 5.

At block 808 of FIG. 8, the signing application 104 embeds a comment into the digital signature.

Referring to FIG. 9, embedded comment information 910 is shown. In the ongoing embodiment, the embedded comment 910 comprises the text "I approve" of the comment 602 of FIG. 6.

At block 810 of FIG. 8, the signing application 104 can embed custom information into the digital signature. This custom information can be received from the signer or another source. The signing application 104 can, for instance, receive custom information from remote locations (such as a time-stamp from a government or other reliable website), a GPS (Global Positioning Satellite) device, and the like. This custom information can be added to the digital signature 902 using custom user code (e.g., script) or other manners for extending the signature block 108 and/or the digital signature 902.

Referring to FIG. 9, embedded custom information 912 is shown. In the ongoing embodiment, the embedded custom information 912 comprises a GPS-determined physical location of the signer's computer (the computer 106) at signing.

At block 812 of FIG. 8, the signing application 104 embeds information indicating what data is signed into the digital signature. In some embodiments, this information is a transformation indicating the data signed, such as by pointing to part or all of an electronic document. This transformation can indicate a particular subtree or subtrees of a structured electronic document to which the digital signature pertains.

Referring to FIG. 9, an embedded data indicator 914 is shown. In this embodiment, the data indicator 914 is part of the signature block 108. In embodiments not using a signature block, the signing application 104 embeds the data indicator 914 into the digital signature 902.

At block 814 of FIG. 8, the signing application 104 locks the digital signature. The signing application 104 can lock the digital signature by computing a strong cryptographic hash over the signed data and the embedded information, or with another suitable technique. The signing application 104 can also embed the strong cryptographic hash within the digital signature.

In the ongoing embodiment of the digital signature 902, the signing application 104 computes a strong cryptographic hash over the information embedded within the signature block 108, such as the static image 904, the meta information 906, the signer identity 908, the comment information 910, the custom information 912, and/or the data indicator 914, and the signed data (indicated by the indicator 914). This strong cryptographic hash is added to the digital signature 902 and locks the embedded information of the digital signature 902 and the signed data (here the data section 102a). If any of the information or the signed data is changed, the strong cryptographic hash of the digital signature 902 will not match with a new hash computed over the changed information and/or signed data. Because of this, the digital signature 902 will be deemed invalid if these are changed. The strong cryptographic hash does not, however, prevent the embedded information from being viewed by persons. It also does not prevent the signed data from being read by a machine. Because the signed data can be read by a machine, it can also be repurposed without breaking the digital signature 902.

Referring to FIG. 9, a signature lock 916 is shown in the digital signature 902. In this embodiment, the digital signature lock 916 comprises the strong cryptographic hash described above.

The digital signature 902 is shown as the signature block 108 with embedded information and locked with a strong cryptographic hash. In other embodiments, however, a digital signature can be built without use of a signature block. In these cases the signing application 104 collects the information, determines the data that is intended to be signed, embeds the information into a digital signature and locks the information and the data.

Conclusion

The above-described digital signatures are secured by an embedded view of the signed data and also permit that data to be repurposed. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-readable media storing computer-executable instructions thereon which, when executed, are configured to perform acts comprising:
    receiving an intention to sign signable data of an electronic document from a user;
    determining information sufficient to recreate a static image of the signable data including one or more specifications of a computing environment used to present the static image;
    presenting to the user, prior to signable data being signed, information to be embedded into a digital signature including the static image of the signable data and the information sufficient to recreate the static image of the signable data; and
    when the user signs the signable data, building a digital signature comprising:
        the signable data signed by the user; and
        embedded information including the static image and the information sufficient to recreate the static image including the one or more specifications of the computing environment used to present the static image.

2. The computer-readable media of claim 1, wherein the acts further comprise:
    presenting a view comprising the digital signature.

3. The computer-readable media of claim 2, wherein the the digital signature comprises an identity of the user.

4. The computer-readable media of claim 1, wherein the act of presenting comprises presenting comments received from the user.

5. The computer-readable media of claim 1, wherein the act of presenting comprises presenting custom information.

6. One or more computer-readable media storing computer-readable instructions thereon which, when executed, are configured to perform acts comprising:
    presenting to a user of a computing environment an electronic document having multiple signable data sections;
    receiving from the user an intention to sign one or more of the multiple signable data sections thereby defining selected data sections;
    determining information sufficient to recreate a static image of the selected data sections including one or more specifications of the computing environment used to present the static image to the user;
    presenting to the user the static image of the selected data sections; and
    building a digital signature by embedding the static image and the information sufficient to recreate the static image in the selected data sections signed by the user, and locking the selected data sections.

7. The computer-readable media of claim 6, wherein the acts further comprise determining a way in which the selected data sections can be signed by analyzing a signature block associated with the selected data sections.

8. The computer-readable media of claim 6, wherein the acts further comprise enabling receipt of comments from the user, and wherein the act of building further comprises building the digital signature having the comments.

9. The computer-readable media of claim 6, wherein the acts further comprise enabling receipt of custom information, and wherein the act of building further comprises extending the digital signature to comprise the custom information.

10. The computer-readable media of claim 6, wherein the acts further comprise compiling information to be embedded into the digital signature and presenting the information to the user.

11. The computer-readable media of claim 10, wherein the information sufficient to recreate the static image of the selected data sections is presented prior to the information being embedded into the digital signature.

12. The computer-readable media of claim 6, wherein the acts further comprise:
    presenting to a second user the static image of the of the selected data sections;
    receiving from the second user an intention to sign the selected data sections; and
    extending the digital signature to include a digital signature of the second user.

13. A method of building a digital signature comprising:
    presenting to a user of a computing environment an electronic document having one or more signable data sections;
    enabling the user to select one or more of the signable data sections;
    receiving from the user a selection of signable data sections;
    presenting to the user a static image of the selection of signable data sections;
    receiving from the user an intention to sign the selection of signable data sections;
    determining information sufficient to recreate the static image of the selection of signable data sections, wherein information sufficient to recreate the static image includes one or more specifications of the computing environment used to present the static image to the user;
    building a digital signature including the static image of the selection of signable data sections and the one or more specifications of the computing environment used to present the static image to the user; and
    storing the digital signature on a computer-readable storage medium.

14. The method of claim 13, wherein the act of presenting to the user a static image of the selection of signable data sections further comprises presenting comments received from the user.

15. The method of claim 14, wherein the act of building the digital signature further comprises extending the digital signature to comprise comments received from the user.

16. The method of claim 13, wherein the act of presenting to the user the static image of the selection of signable data sections further comprises enabling the user to provide custom information to be embedded within the digital signature.

17. The method of claim 16, wherein the act of building a digital signature further comprises extending the digital signature to comprise custom information.

18. The method of claim 13, further comprising:

presenting a view comprising the static image of the of the selection of signable data sections after the digital signature is stored on a computer-readable storage medium.

19. The method of claim 13, further comprising:

presenting to a second user the static image of the of the selection of signable data sections after the digital signature is stored on a computer-readable storage medium.

20. The method of claim 19, further comprising:

receiving from the second user an intention to sign the selection of signable data sections; and extending the digital signature to include a digital signature of the second user.

* * * * *